United States Patent
Martin

(10) Patent No.: US 11,998,863 B2
(45) Date of Patent: Jun. 4, 2024

(54) PLACE AND COST EFFICIENT PLANT AND PROCESS FOR SEPARATING ONE OR MORE PURIFIED HYDROCARBON STREAMS FROM CRUDE HYDROCARBON STREAMS, SUCH AS FOR NAPHTHA STABILIZATION AND LPG RECOVERY

(71) Applicant: SULZER MANAGEMENT AG, Winterthur (CH)

(72) Inventor: Gary R. Martin, Grapevine, TX (US)

(73) Assignee: SULZER MANAGEMENT AG, Winterthur (CH)

( * ) Notice: Subject to any disclaimer, the term of this patent is extended or adjusted under 35 U.S.C. 154(b) by 16 days.

(21) Appl. No.: 17/781,360

(22) PCT Filed: Nov. 30, 2020

(86) PCT No.: PCT/US2020/062565
§ 371 (c)(1),
(2) Date: May 31, 2022

(87) PCT Pub. No.: WO2021/113166
PCT Pub. Date: Jun. 10, 2021

(65) Prior Publication Data
US 2023/0001324 A1    Jan. 5, 2023

Related U.S. Application Data

(60) Provisional application No. 62/945,145, filed on Dec. 7, 2019.

(51) Int. Cl.
*B01D 3/00*    (2006.01)
*B01D 3/14*    (2006.01)
(Continued)

(52) U.S. Cl.
CPC ............... *B01D 3/141* (2013.01); *C10G 5/04* (2013.01); *C10G 7/02* (2013.01); *C10G 2300/1044* (2013.01)

(58) Field of Classification Search
CPC .................... C10G 67/02; C10G 45/46; C10G 2300/1059; C10G 2300/301;
(Continued)

(56) References Cited

U.S. PATENT DOCUMENTS 5,836,174 A    11/1998    Billingham et al.
6,416,658 B1 *    7/2002    Maraschino ........... C10G 45/02
                                                            208/213

(Continued)

FOREIGN PATENT DOCUMENTS

CN    106621436 A    5/2017
WO    2012074691 A2    6/2012
WO    WO 2017/0127508    *    7/2017

OTHER PUBLICATIONS

International Search Report issued Mar. 12, 2021 in corresponding International Application No. PCT/US2020/062565.
(Continued)

*Primary Examiner* — Prem C Singh
*Assistant Examiner* — Brandi M Doyle
(74) *Attorney, Agent, or Firm* — GLOBAL IP COUNSELORS, LLP

(57) ABSTRACT

A plant for separating at least one purified hydrocarbon stream from at least one crude hydrocarbon feed stream. The plant comprises a vessel with a single foundation. The vessel comprises an absorber section and a first divided-wall column. The first divided-wall column comprises a dividing wall, a stripper section, and a stabilization section.

15 Claims, 7 Drawing Sheets

(51) Int. Cl.
*C10G 5/04* (2006.01)
*C10G 7/02* (2006.01)

(58) Field of Classification Search
CPC .... C10G 2300/1044; C10G 2300/4018; C10G 2300/4006; C10G 2300/302; C10G 2400/14; C10G 2300/304; C10G 2300/1055; C10G 2300/202
See application file for complete search history.

(56) References Cited

U.S. PATENT DOCUMENTS

| | | |
|---|---|---|
| 7,404,834 B2 | 7/2008 | Billig et al. |
| 10,377,690 B1 | 8/2019 | Owens et al. |
| 2008/0081937 A1* | 4/2008 | Schultz .................. C10G 7/02 585/648 |
| 2011/0139604 A1 | 6/2011 | Burst et al. |
| 2012/0141333 A1* | 6/2012 | Ulas Acikgoz ........ B01D 3/141 422/187 |
| 2016/0263492 A1* | 9/2016 | Gao ....................... B01D 3/008 |
| 2018/0370875 A1* | 12/2018 | Manchekar .............. B01D 3/42 |
| 2019/0083898 A1 | 3/2019 | Bhargava et al. |
| 2019/0282920 A1 | 9/2019 | Schon et al. |

OTHER PUBLICATIONS

Written Opinion issued Dec. 16, 2021 in corresponding International Application No. PCT/US2020/062565.

International Preliminary Report on Patentability issued Mar. 22, 2022 in corresponding International Application No. PCT/US2020/062565.

* cited by examiner

PLACE AND COST EFFICIENT PLANT AND PROCESS FOR SEPARATING ONE OR MORE PURIFIED HYDROCARBON STREAMS FROM CRUDE HYDROCARBON STREAMS, SUCH AS FOR NAPHTHA STABILIZATION AND LPG RECOVERY

CROSS-REFERENCE TO RELATED APPLICATION

This application is a U.S. National Stage application of International Application No. PCT/US2020/062565, filed of Nov. 30, 2020, which claims priority to U.S. Provisional Application No. 62/945,145, the contents of which are hereby incorporated by reference.

FIELD OF THE INVENTION

The present disclosure relates to a plant for separating at least one purified hydrocarbon stream from at least one crude hydrocarbon feed stream. Furthermore, the present disclosure relates to a process comprising separating at least one purified hydrocarbon stream from at least one crude hydrocarbon feed stream, wherein the process is performed in such a plant.

BACKGROUND INFORMATION

Distillation and absorption for recovery of an LPG stream, a stabilized naphtha stream and a fuel gas stream from feeds comprised of unstabilized naphtha stream(s) and light component gas stream(s) are common separation techniques used in the process industries. Both techniques require a large amount of plot space, raw materials for construction, and capital expenditures. Distillation and absorption often require designing for high-pressure operation, which results in significant quantities of raw materials and capital expenditures to construct the equipment necessary to implement the distillation and absorption techniques.

Known plants for recovery of an LPG stream, a stabilized naphtha stream and a fuel gas stream from feeds comprised of unstabilized naphtha stream(s) and lightened component gas stream(s) typically comprise four separate distillation and absorption column vessels, namely a stripper distillation column, a primary absorber column, a sponge absorber column and a depropanizer or debutanizer column. However, the use of four separate column vessels consumes a lot of plot space, requires foundations for all four columns, increases raw material usage and increases capital expenditures. In addition, this conventional approach to separation leads to a so-called "back-mixing" of components that takes place in the bottom of the stripper column, because the LPG boiling range products are concentrated at an intermediate point within the stripper column only to be downgraded to a lower concentration at the bottom of the stripper column. Therefore, components that were previously separated are recombined. As set out further below, the design of the present disclosure avoids this inefficiency to also reduce energy consumption as well as capital cost.

In view of this, the object underlying the present disclosure is to provide a plant and process for separating one or more purified hydrocarbon stream(s) from one or more crude hydrocarbon feed stream(s), in particular for recovering stabilized naphtha, liquefied petroleum gas (LPG) and fuel gas from a feed stream containing unstabilized naphtha and a feed stream containing lightened gas, in which the required plot space is reduced, the raw material consumption for construction is reduced and the capital expenditures are decreased, while improving the separation efficiency and particularly the LPG recovery so that an efficient and cost efficient plant may be installed even at locations with limited plot space.

SUMMARY

In accordance with the present disclosure, this object is satisfied by providing a plant for separating at least one purified hydrocarbon stream from at least one crude hydrocarbon feed stream, in particular for recovering stabilized naphtha, liquefied petroleum gas (LPG) and fuel gas from a feed stream containing unstabilized naphtha and a feed stream containing lightened gas. The plant comprises a vessel with a single foundation. The vessel comprises an absorber section and a first divided-wall column. The first divided-wall column comprises a dividing wall, a stripper section and a stabilization section.

By combining an absorber section, a stripper section and a stabilization section within one vessel with a single foundation, wherein at least the stripper section and the stabilization section are comprised in a first divided-wall column comprising a dividing wall, a plant requiring reduced plot space, with a reduced raw material consumption for construction and lower capital expenditures is obtained. In particular, a plant is obtained in which the separation efficiency, and in particular—in a LPG separating plant—the LPG recovery, can be improved so that an efficient and cost efficient plant may be installed even at locations with limited plot space. The provision of a first divided-wall column in the vessel also allows one to combine two usually separate distillation columns, namely a stripper column and a stabilization column, into one column, and also to improve the separation efficiency of the two columns. Furthermore, the aforementioned "back-mixing" of components that takes place in the bottom of the stripper column of the prior art is eliminated. Thus, the plant and process of the present disclosure provide an innovative technique, wherein the components in conventional multi-vessel plants are combined into a single vessel requiring only one foundation. Thereby, the number of required foundations may be reduced from four as in conventional plants to one for the plant of the present disclosure as further described below. In addition, the amount of metal required for the vessel and column insulation of the plant of the present disclosure is drastically lower, namely up to 30% lower, than that of conventional plants due to the merge of two distillation columns into one divided-wall column. Thereby, the number of ladders and platforms can be reduced in half and the resulting weight reduction decreases the load that is supported by the single foundation. The plant and process according to the present disclosure are particularly suitable for the recovery of an LPG stream, a stabilized naphtha stream and a fuel gas stream from crude hydrocarbon feed streams comprising unstabilized naphtha stream(s) and lightened component gas stream(s). All in all, the plant of the present disclosure using divided-wall technology allows significant reduction of the capital investment costs, enables improved product recovery/separation and a decreased plot space requirement for new units. Moreover, the naphtha stabilization and LPG recovery plant of the present disclosure is very tolerant of large variations in the crude hydrocarbon feed stream composition. For example, feeds to the plant may comprise variations of non-condensables (such as hydrogen) without negatively impacting the plant operation and performance. Additional benefits of the naphtha stabilization and LPG recovery plant of the present disclosure are that it allows an improved handling of water in the feed, elimination of the need for a bottoms pump for use in connection with the absorber, a more optimized design of tray count on both sides of the divided-wall column and an improved optimization of column diameters.

The terms "stripper section", "stabilization section" and "absorber section" as well as the subsequently used terms "primary absorber section" and "sponge absorber section" are generally used in the present disclosure without any structural limitation to simply facilitate the denotation of the different sections of the vessel of the plant in accordance with the present disclosure. Preferably, the stripper section is embodied so as to work during the operation of the plant as a stripper (which is also called in this technical field a deethanizer), whereas the stabilization section is preferably embodied so as to work during the operation of the plant as a stabilizer, a depropanizer or a debutanizer, respectively, and the absorber section is preferably embodied so as to work during the operation of the plant as an absorber, as set out below in more detail. As set out below, the absorber section may be provided in the first divided-wall column or may be arranged in the vessel outside of the first divided-wall column.

Moreover, the term first divided-wall column is defined in the present patent disclosure broadly as any column being usable as a distillation column or absorber column comprising a wall, which at least partially subdivides the interior space of the column into at least two sections, which are separated from each other by the dividing wall, irrespective of the location of the dividing wall and irrespective of the form of the dividing wall. The prefix "first" is only used to easily distinguish this divided-wall column from any other optionally present divided-wall column of the plant and does not mean that another divided-wall column is necessarily present nor that, if one or more other divided-wall columns are present, there is a particular arrangement or order, respectively, between the first and optional other divided-wall columns.

In addition, the term "vessel" means in accordance with the present disclosure one or more columns using one common foundation. The one or more columns of the vessel are connected with each other so as to form one single vessel, as set out in more detail further below. For instance, the one or more columns of the vessel may be connected with each by a frame, which is for instance made by a wall, or by any other connection part, such as fasteners, screws, bolts and the like. Importantly, the one or more columns are connected such that only one foundation is present and needed, namely the foundation required already for one of the two columns.

Preferably, the dividing wall partially divides the first divided-wall column into a first side comprising the stripper section and into a second side comprising the stabilization section so that the divided-wall column comprises a portion with the first side and the second side being divided by the dividing wall arranged therebetween and one or two other portions that are not divided by the dividing wall, wherein the first divided-wall column further comprises a feed line coupled to the stripper section and configured to provide at least one crude hydrocarbon feed stream to the stripper section and a bottoms removal line coupled to the bottom and configured to remove a bottom stream from the first divided-wall column. The first and second sides separated from each other by the dividing wall may be, but must not be of the same dimensions, i.e. the dividing wall may partially divide the first divided-wall column into a first half comprising the stripper section and into a second half comprising the stabilization section.

In accordance with a further embodiment of the present disclosure, the plant further comprises a condenser, which is coupled to the stabilization section of the first divided-wall column via a gas line so as to receive a gas stream from the stabilization section and via a recirculation line so as to recirculate at least a part of the condensate formed in the condenser into the stabilization section of the first divided-wall column. The condenser may be also considered as part of the first divided-wall column, even if it is located outside the first divided-wall column, because it is coupled via lines to the first divided-wall column.

Moreover, it is preferred that the plant further comprises a reboiler, which is coupled to the bottom of first divided-wall column via a liquid line and configured to receive a bottom stream from the first divided-wall column and coupled to the bottom of first divided-wall column via a recirculation line so as to recirculate at least a part of the gas formed in the reboiler into the first divided-wall column. The reboiler may be also considered as part of the first divided-wall column, even if it is located outside the first divided-wall column, because it is coupled via lines to the first divided-wall column.

In accordance with a first preferred embodiment of the present disclosure, the absorber section is arranged in the vessel outside the first divided-wall column. In this embodiment, the first divided-wall column is a closed column (i.e. a column entirely margined by a wall), wherein the dividing wall extends preferably from the top of the first divided-wall column over a part of the height of the first divided-wall column at least essentially vertically downwards so that the divided-wall column comprises an upper portion with the first side and the second side being divided by the dividing wall arranged therebetween and a further lower portion being not divided by the dividing wall. Essentially vertically downwards means that the angle between the dividing wall and the length axis of the first divided-wall column is at most 20°, preferably at most 10°, more preferably at most 5° and most preferably 0°, wherein the height of the first divided-wall column is the straight distance between the top and the bottom of the first divided-wall column.

It is preferred in the aforementioned embodiment that the dividing wall of the first divided-wall column extends from the top of the first divided-wall column over 10 to 95%, more preferably over 20 to 90%%, yet more preferably over 20 to 80%, even more preferably over 30 to 70% and most preferably over 40 to 70% of the height of the first divided-wall column. In other words, preferably the lower 5 to 90%, more preferably the lower 10 to 80%%, yet more preferably the lower 20 to 80%, even more preferably the lower 30 to 70% and most preferably the lower 30 to 60% of the height of the first divided-wall column are not subdivided by the dividing wall.

In accordance with a further embodiment of the present disclosure, it is proposed that in the aforementioned first preferred embodiment of the present disclosure the vessel comprises a second column which is arranged on top of (i.e. placed onto) or above (i.e. placed in a distance above) the first divided-wall column, wherein the second column comprises the absorber section, at least one feed line and at least one removal line. More specifically, preferably the whole interior of the second column is in this embodiment the absorber section.

It is further preferred in the aforementioned embodiment that the second column comprises in its upper part a first gas removal line and in its lower part a second removal line, wherein the plant further comprises a condenser, which is coupled to the second column via the first gas removal line so as to receive a gas stream from the second column and coupled to the second column via a recirculation line so as to recirculate at least a part of the condensate formed in the condenser into the second column.

In accordance with the present disclosure, the vessel comprises both the first divided-wall column and the absorber section, i.e. in the aforementioned embodiment the second column. The first divided-wall column and the second column are preferably connected with each other by a connection part. The connection part may be a continuation of the vessel connected by welding of the vessel metal or using a flange connection with fasteners, such as bolt(s) and the like. Alternatively, or in addition thereto, a frame may be positioned onto the top of the first divided-wall column being adapted in its form to the upper part of the first divided-wall column and to the lower part of the second column so that the frame fixes the second column on the first divided-wall column. As set out above, it is important that the one or more columns are so connected that only one foundation is present and needed, namely the foundation required already for one of the two columns.

The second column of the aforementioned embodiment may be a column with one interior space, which is not subdivided by any wall into two or more sections, i.e. which does not comprise a dividing wall.

Alternatively, the second column may be a divided-wall column comprising a dividing wall, wherein the dividing wall at least partially divides and preferably completely divides the second divided-wall column into a first side comprising a primary absorber section and a second side comprising a sponge absorber section. The sum of the primary absorber section and the sponge absorber section forms the absorber section. Only a low-pressure differential between the primary absorber and the sponge absorber is necessary, which enables the use of relatively thin material for the dividing wall. The vessel wall differential pressure is near 200 psi, whereas the dividing wall differential pressure can be less than 2 psi. Thus, the overall the amount of metal required for the vessel and column insulation of the plant of the present disclosure is drastically lower, namely up to 30% lower, than that of conventional plants due to the merge of two distillation columns into one divided-wall column. In this embodiment, the second divided-wall column replaces two separate absorber columns and the first divided-wall column also replaces two separate distillation columns required in conventional plants, so that the number of columns is reduced from four to two and the number of foundations is reduced from four to one.

Preferably, the dividing wall of the second divided-wall column extends from the top of the second divided-wall column at least essentially vertically downwards to the bottom of the second divided-wall column so as to completely fluid tightly separate the first side from the second side of the second divided-wall column. In other words, in contrast to the preferred embodiment of the first column, wherein the dividing wall of the first divided-wall column only extends over a part of the height of the first divided-wall column, it is preferred for the second divided-wall column that the dividing wall extends over the whole height of the second divided-wall column. Also, in this embodiment it is possible, but not necessary, that the plant further comprises a condenser, which is coupled to the second side of the second divided-wall column via the first gas removal line so as to receive a gas stream from the second side and coupled to the second side of the second divided-wall column via a recirculation line so as to recirculate at least a part of the condensate formed in the condenser into the second side of the second divided-wall column.

In accordance with a second preferred embodiment of the present disclosure, the absorber section is arranged in the vessel within the first divided-wall column and not outside the first divided-wall column as in the first preferred embodiment of the present disclosure. In this embodiment, the vessel is the first distillation column and thus does not need to comprise a further device, such as a further device comprising the absorber section. Thereby, two distillation columns and one absorber column required in conventional plants are combined in this embodiment to one column. Thereby, the overall the amount of metal required for the vessel and column insulation of the plant of the present disclosure is drastically reduced, namely by up to 30%, as compared with conventional plants. In addition, the number of columns is reduced from three to one and the number of foundations is reduced from three to one. Furthermore, this embodiment allows to reduce the total number of ladders and platforms in half and the resulting weight reduction decreases the load that is supported by the single foundation.

Preferably, in this second preferred embodiment of the present disclosure, the first divided-wall column comprises an outer wall comprising an upper section, which comprises the absorber section, and a lower section, which is connected with the upper section, wherein the lower section comprises the dividing wall, the stripper section and the stabilization section. Preferably, the uppermost part of the dividing wall defines the upper end of the lower section and the lower end of the upper section.

Preferably, the upper section of the first divided-wall column of this embodiment has a smaller diameter than the lower section of the first divided-wall column. For example, the diameter of the upper section of the first divided-wall column is 10 to 90% and preferably 20 to 60% of the diameter of the lower section. The reduction in diameter may be stepwise, i.e. the whole lower section has the same diameter and the whole upper section has the same diameter. Alternatively, the reduction in diameter may be gradual, i.e. the upper part of the lower section or the lower part of the upper section or both thereof are tapered so that the diameter of the lower section of the first divided-wall column gradually reduces to the smaller diameter of the upper section.

In accordance with a preferred variant of this second preferred embodiment of the present disclosure, the dividing wall extends from the uppermost part of the lower section of the first divided-wall column downwardly so as to partially divide the lower section of the first divided-wall column into a first side comprising the stripper section and into a second side comprising the stabilization section so that the lower section comprises an upper portion with the first side and the second side being divided by the dividing wall arranged therebetween and a further lower portion that is not divided by the dividing wall.

Preferably, the dividing wall extends from the uppermost part of the lower section of the first divided-wall column over at least 10%, preferably over at least 20%, more preferably over 20 to 80%, even more preferably over 30 to 70%, and most preferably over 40 to 70%, of the height of the first divided-wall column so that the lower section comprises an upper portion with the first side and the second side being divided by the dividing wall arranged therebetween and a further lower portion that is not divided by the dividing wall.

The dividing wall of this second preferred embodiment of the present disclosure may extend at least essentially vertically downwards. However, it is preferred that the dividing wall comprises an upper inclined section and a lower at least essentially vertical section, wherein the upper inclined section extends from the lower essentially vertical section to a part of the inner side of the outer wall of the first divided-wall column. In other words, the upper inclined section of the dividing wall connects the lower essentially vertical section of the first divided-wall column fluidly tightly with a part the outer wall of the first divided-wall column so that preferably one side adjacent of the lower essentially vertical section of the dividing wall is connected at the top of the lower essentially vertical section by the upper inclined section with the inner side of the outer wall of the first divided-wall column and is thus closed above the upper inclined section, whereas the opposite side adjacent of the lower essentially vertical section of the dividing wall is not connected at the top of the lower essentially vertical section by an upper inclined section with the inner side of the outer wall of the first divided-wall column and is thus open from above so that fluid may enter from above into this opposite side. Preferably, the upper inclined section comprises an upper edge and a lower edge and the lower essentially vertical section comprises an upper edge and a lower edge, wherein the upper edge of the lower essentially vertical section and the lower edge of the upper inclined section of the dividing wall are connected with each other over the whole length of both edges, wherein the lower essentially vertical section of the dividing wall extends at least essentially vertically downwards, and wherein the upper inclined section of the dividing wall extends from the upper edge of the lower essentially vertical section of the dividing wall in an inclined angle to the outer wall and is fluid tightly connected with the outer wall of the first divided-wall column.

Good results are for instance obtained, when the inclined angle between the upper section of the dividing wall and the length axis of the first divided-wall column is more than 90° to less than 180°, preferably 110° to 160°, and more preferably 120° to 150°, seen in the direction from the bottom to the top of the first divided-wall column.

In another variant of this second preferred embodiment of the present disclosure, the dividing wall does not comprise an upper inclined section and a lower essentially vertical section, but an upper at least essentially horizontal section and a lower at least essentially vertical section, wherein the upper at least essentially horizontal section extends from the lower at least essentially vertical section to a part of the inner side of the outer wall of the first divided-wall column. In other words, the upper at least essentially horizontal section of the dividing wall connects the lower at least essentially vertical section of the first divided-wall column fluidly tightly with a part of the outer wall of the first divided-wall column so that preferably one side adjacent of the lower essentially vertical section of the dividing wall is connected at the top of the lower essentially vertical section by the upper at least essentially horizontal with the inner side of the outer wall of the first divided-wall column and is thus closed above the upper at least essentially horizontal section, whereas the opposite side adjacent of the lower essentially vertical section of the dividing wall is not connected at the top of the lower essentially vertical section by an upper at least essentially horizontal section with the inner side of the outer wall of the first divided-wall column and is thus open from above so that fluid may enter from above into this opposite side. Preferably, the upper at least essentially horizontal section comprises —, radially seen, an inner edge and an outer edge, and the lower essentially vertical section comprises an upper edge and a lower edge, wherein the upper edge of the lower essentially vertical section and the inner edge of the upper essentially horizontal section of the dividing wall are connected with each other over the whole length of both edges, wherein the lower essentially vertical section of the dividing wall extends at least essentially vertically downwards, and wherein the upper at least essentially horizontal section of the dividing wall extends from the upper edge of the lower essentially vertical section of the dividing wall to the outer wall and is fluid tightly connected with a part of the outer wall of the first divided-wall column. Essentially horizontal means that the angle between the upper section of the dividing wall and the plane being perpendicular to the length axis of the first divided-wall column is at most 20°, preferably at most 10°, more preferably at most 5°, and most preferably 0°, whereas essentially vertical means that the angle between the lower section of the dividing wall and the length axis of the first divided-wall column is at most 20°, preferably at most 10°, more preferably at most 5°, and most preferably 0°.

It is further preferred that the first divided-wall column in this second preferred embodiment of the present disclosure further comprises a feed line coupled to the stripper section and configured to provide feed to the stripper section, a bottoms removal line coupled to the bottom of the first divided-wall column and configured to remove a bottom stream from the first divided-wall column, two absorption fluid lines coupled to the absorber section and configured to provide absorption fluid to the absorber section of the first divided-wall column as well as a gas removal line coupled to the top of the first divided-wall column and configured to remove a gas stream from the first divided-wall column.

Also in this embodiment, it is preferred that the plant further comprises a condenser, which is coupled to the stabilization section of the first divided-wall column via a gas line so as to receive a gas stream from the stabilization section and via a recirculation line so as to recirculate at least a part of the condensate formed in the condenser into the stabilization section of the first divided-wall column.

Moreover, it is also preferred in this embodiment that the plant further comprises a reboiler, which is coupled to the bottom of the first divided-wall distillation column via a liquid line and configured to receive a bottom stream from the first divided-wall column and via a recirculation line so as to recirculate at least a part of the gas formed in the reboiler into the first divided-wall distillation column.

Each of the absorber section, the stripper section and the stabilization section of any of the aforementioned embodiments may comprise at least one element selected from the group consisting of trays, structured packings, random packings and arbitrary combinations of two or more of the aforementioned elements. In addition, where necessary distributors and collectors may be included in the upper and lower part of each of the absorber section, the stripper section and the stabilization section.

Preferably, the stripper section is embodied to work during the operation of the plant as a stripper (which is also called in this technical field a deethanizer), i.e. to separate an overhead stream comprising a $C_2$ and lighter hydrocarbon stream. For this purpose, the stripper section preferably comprises trays or structured packings and comprises, over its height defined by the dividing wall separating the stripper section from the stabilization section of the first divided-wall column, 4 to 30 theoretical stages and more preferably 8 to 15 theoretical stages.

Moreover, it is preferred that the stabilization section is embodied to work during the operation of the plant as a stabilizer, a depropanizer or a debutanizer, respectively. For this purpose, the stabilization rectifying section preferably comprises trays or structured packings and comprises, over its height defined by the dividing wall separating the stripper section from the stabilization rectifying section of the first divided-wall column, 5 to 25 theoretical stages and more preferably 7 to 15 theoretical stages.

The section of the first divided-wall column below the dividing wall partially acts as a stripper section as well as a stabilization section as it can also strip out ethane and lighter components. But it is limited in this role, since any ethane stripped out below the dividing wall can end up in the stripper section, which is good, or in the stabilization section arranged at the other side of the wall which will contaminate the product on this side of the wall, which is bad. The stabilization stripping section, which is located below the dividing wall, may comprise trays or structured packings and preferably comprises 5 to 25 theoretical stages and more preferably 5 to 20 theoretical stages.

Furthermore, it is preferred that the absorber section and, if the absorber section comprises both a primary absorber section and a sponge absorber, the primary absorber section and the sponge absorber, are embodied to work during the operation of the plant as absorbers. For this purpose, the aforementioned sections preferably comprise trays or structured packings and comprise over their height 5 to 30 theoretical stages and more preferably 5 to 15 theoretical stages.

In a further embodiment of the present disclosure, it is suggested that the plant further comprises a high-pressure receiver unit comprising at least one inlet line and at least one outlet line, wherein at least one outlet line is directly or indirectly coupled with the stripper section of the first divided-wall column. In this embodiment, the one or more crude hydrocarbon feed streams are preferably fed into the high-pressure receiver unit so as to preferentially condense propane and heavier components in the gaseous crude hydrocarbon feed stream(s) to a liquid phase, while preferentially keeping the ethane and lighter components in the gas phase, wherein at least a part of the liquid phase is fed into the stripper section of the first divided-wall column. Water entrapment in the absorber/deethanizing sections is a common problem. Tying the liquid from the absorber section and the vapor from the deethanizer section back into the high-pressure receiver unit provides a high residence time region for water separation from the oil and enables its removal. The high-pressure receiver unit also provides an additional stage of separation between the $C_2$ and lighter components from the $C_3$ and heavier components. In this variant, it is proposed that the high-pressure receiver unit comprises at least one liquid outlet for the condensed hydrocarbons, at least one liquid outlet for water and optionally at least one outlet for gas, wherein the at least one liquid outlet for the condensed hydrocarbons is preferably connected with the stripper section of the first divided-wall column.

In a further preferred embodiment of the present disclosure, the plant further comprises an intercooler exchanger system, which is in fluid communication with the absorber section via an inlet line and an outlet line and, in the case the absorber section comprises a primary absorber section and a sponge absorber section, is in fluid communication with the primary absorber section. This embodiment allows removal of absorption heat generated in the absorber from the absorber section.

Depending on the application of the plant, it might be preferred that the plant further comprises—in addition to the absorber section comprised in the vessel—a sponge absorber column, which is arranged outside the vessel and which is connected preferably via at least one line directly or indirectly with the absorber section of the vessel and, if the absorber section comprises a primary absorber section and a sponge absorber section, with the sponge absorber section.

Moreover, depending on the application of the plant, the plant may further comprise—in addition to the first divided-wall column—a further divided-wall column, which is arranged outside the vessel and comprises a dividing wall and which is connected preferably via at least one line directly or indirectly with the bottom of the first divided-wall column of the vessel. Preferably, the further divided-wall column is a bottom divided-wall column, in which the dividing wall extends from the bottom of the further divided-wall column upwardly over 10 to 95%, preferably over 20 to 90%%, more preferably over 20 to 80%, even more preferably over 30 to 70%, and most preferably over 40 to 70%, of the height of the further divided-wall column.

A further aspect of the present disclosure is a process for separating one or more purified hydrocarbon stream(s) from one or more crude hydrocarbon feed stream(s), wherein the process is performed in the above described plant.

The process is in particular suitable, when the crude hydrocarbon feed stream is a gas stream obtained in a fluid catalytic cracking unit (FCCU), in a saturated gas plant (SGP), in a coker gas plant, in an isomerization unit stabilization section, in a flare header recovery system or in a natural gas liquids (NGL) fractionating plant.

In accordance with a further preferred embodiment of the present disclosure, two crude hydrocarbon feed streams, namely an unstabilized naphtha stream and a lightened gas stream, are used so as to recover as purified gas hydrocarbon streams, a naphtha stream, a LPG stream and a fuel gas stream.

The one or more crude hydrocarbon feed stream(s) is/are fed directly or indirectly preferably via a feed line into the stripper section of the first divided-wall column.

Depending on the application, it is preferred that the crude hydrocarbon feed stream is first fed into a high-pressure receiver unit, where preferentially propane and heavier components are condensed to a liquid phase, while preferentially keeping the ethane and lighter components in the gas phase, wherein at least a part of the condensed liquid phase is fed via the feed line into the stripper section of the first divided-wall column. If the crude hydrocarbon feed stream contains traces of water, the liquid phase is preferably separated in the high-pressure receiver unit by gravity into water and condensed hydrocarbon liquid, wherein at least a part of the condensed hydrocarbon liquid is fed via the feed line into the stripper section of the first divided-wall column.

In some applications, during the process as absorption fluid, at least one of a vapor stream from a high-pressure receiver unit, a cooled stabilized naphtha stream, and a cooled unstabilized naphtha stream may be fed to the absorber section or, in the case the absorber section comprises a primary absorber section and a sponge absorber section, to the primary absorber section. In this embodiment, in the vessel a bottom liquid stream of naphtha absorption oil and recovered light is produced.

In other applications, during the process the vessel may comprise a primary absorber section and a sponge absorber section, wherein at least one of a gas stream and a heavier lean sponge oil liquid stream is fed to the sponge absorber section as absorption fluid. It is preferred in this embodiment that in the vessel, a bottom liquid stream of rich sponge absorption oil and recovered light components is produced.

In a further embodiment of the present disclosure, it is preferred that one or two feed streams comprising preferably unstabilized naphtha and/or lightened gas, are fed to the stripper section, wherein in the stripper section $C_2$ and lighter hydrocarbons are separated, in the stabilization section $C_3$ and $C_4$ hydrocarbons are separated, so that a $C_{5+}$ hydrocarbon stream is obtained as a bottom stream, a $C_{3-4}$ hydrocarbon stream, which is preferably a LPG stream, is obtained as an overhead stream of the stabilization section, and a fuel gas stream of primarily $C_2$ and lighter components is obtained as an overhead stream of the absorber section of the vessel.

In a still further embodiment of the present disclosure, it is preferred that in the vessel a bottom liquid stream comprising a stabilized naphtha product is produced with a slip stream of the bottom recycled back to the first divided-wall column for use as stabilized absorption fluid.

BRIEF DESCRIPTION OF THE DRAWINGS

The invention will be explained in more detail hereinafter with references to the drawings.

DETAILED DESCRIPTION

Figure 1:
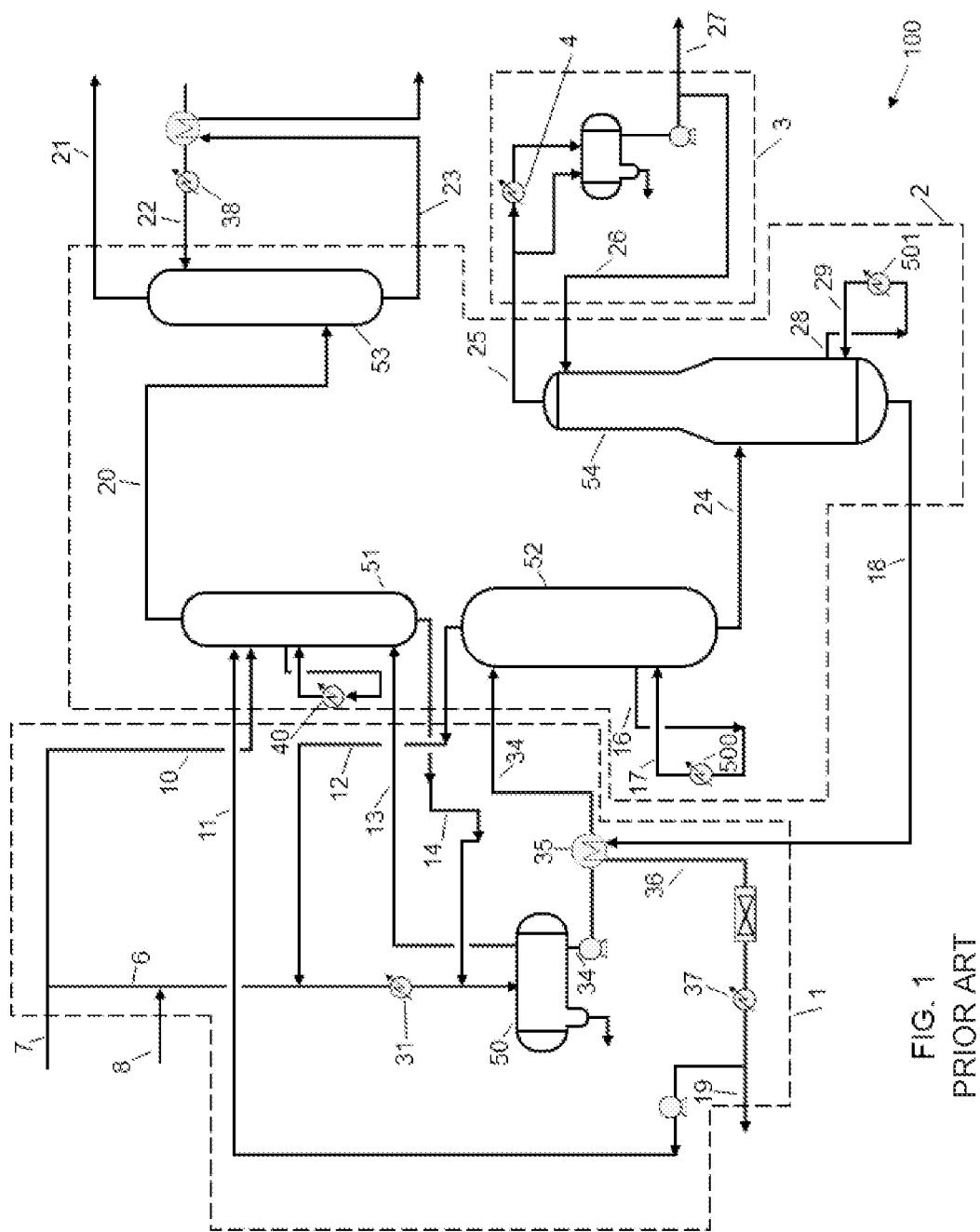
FIG. 1 illustrates a four-vessel conventional separation plant in accordance with the prior art.

The term "unstabilized naphtha" refers to hydrocarbons where the primary components of these hydrocarbons have boiling points greater than $C_4$ components but also include lighter components such as $C_3$ hydrocarbons, $C_2$ hydrocarbons, methane, hydrogen, etc. Unstabilized naphtha typically has greater than 5 wt % $C_4$ and lighter components but may be between 1 and 5 wt %.

The term "stabilized naphtha" refers to hydrocarbons where the primary components of these hydrocarbons have boiling points equal to isopentane and higher with much less quantity of $C_4$ hydrocarbons and lighter components. The term stabilized naphtha will be dependent on whether the plant stabilizer is to be designed as a depropanizer or as a debutanizer. A stabilizer designed as a depropanizer will have a stabilized naphtha with typically 1 wt % or less $C_3$ and lighter components. A stabilizer designed as a debutanizer will have stabilized naphtha typically with 2 wt % or less $C_4$ and lighter components and even more commonly has 1 wt % or less $C_4$ and lighter components. Downstream processing and product specification requirements will dictate the quantity of these lighter components.

The term "LPG" or "liquefied petroleum gas" refers to hydrocarbons where the primary components of these hydrocarbons have boiling points as light as propylene and as high as the heaviest butene component with much less quantity of $C_5$ hydrocarbons and heavier components as well as much less quantity of ethane and lighter components. LPG will have less than 10% $C_2$ and lighter components and less than 10% $C_6$ and heavier components. If the stream LPG is a propane stream from a saturate gas plant and sold as HD5 propane it will have a minimum of 90% propane. Although, some embodiments may include recovering $C_5$ hydrocarbons components in the LPG depending on downstream processing requirements. If it is LPG from an FCCU and is fed to an alkylation unit the quantity of lights and heavy components will be dictated by the downstream processing. Downstream processing and product specification requirements will dictate the quantity of these heavier and lighter components.

The term "lightened gas" refers to hydrocarbons and nonhydrocarbons where the primary components of these hydrocarbons and nonhydrocarbons have boiling points as light as hydrogen and as high as heptane with much less quantity of components having boiling points greater than normal heptane.

The terms "off gas" and "fuel gas" refer to hydrocarbons and nonhydrocarbons where the primary components of these hydrocarbons and nonhydrocarbons have boiling points as light as hydrogen and as high as ethane with much less quantity of components having boiling points greater than ethane. Propylene and heavier components are normally much more valuable and their recovery from the normally much lower value off gas stream is usually desired. Economics typically drive the design to recover 95% or greater of the $C_3$ and heavier components from the off gas.

Referring now to FIG. 1, a prior art naphtha stabilization and LPG recovery plant 100 is shown. The plant comprises a high-pressure receiver 50 and four different vessels, namely one stripper distillation column 52, one debutanizer (or stabilizer, respectively) distillation column 54, one primary absorber column 51 and one sponge absorber column 53. Each of these four columns 52, 54, 51, 53 has its own foundation and therefore requires an extra plot space. The plant 100 is designed to separate one or more hydrocarbon streams that could be represented by unstabilized naphtha stream(s) and/or lightened component stream(s) into a fuel gas stream being output via a line 21, a non-condensable stream LPG stream being output via a line 27 and a stabilized naphtha stream being output via a line 19 from the plant 100.

More specifically, the plant 100 comprises a cooling and absorbing section 1, a fractionating section 2 and a LPG condensing section 3, which are shown in FIG. 1 in dashed lines. The plant 100 comprises two feed lines 7, 8 that are introduced to the cooling and absorbing section 1. While feed line 7 is for feeding unstabilized naphtha stream, the feed line 8 is for feeding a lightened component gas stream into the cooling and absorbing section 1 of the plant 100. The feed line 7 splits into a line 10 leading to the primary absorber column 51 as an absorption oil, and into a line 6. Feed line 8 leads into line 6 and thus introduces the lightened component gas stream into the stream of unstabilized naphtha. Downstream thereof, line 6 is coupled to a heat exchanger 31 and leads into the high-pressure receiver 50. The heat exchanger 31 may comprise a fin-fan cooled exchanger, a cooling water exchanger or a combination of both, and its function is to cool the feed stream. The high-pressure receiver 50 operates at a temperature of 10° C. to 65° C., but more commonly at 45° C. and at a pressure of 1.034 to 2.758 MPa, but more commonly at 1.379 MPa, wherein the propane and heavier components contained in the gaseous crude hydrocarbon feed stream are condensed in the high-pressure receiver 50 to a liquid phase, while preferentially keeping the ethane and lighter components in the gas phase. The gas phase of the high-pressure receiver 50 is fed via a line 13 into the primary absorber column 51, whereas the liquid phase of the high-pressure receiver 50 is fed via line 34, which is connected with a heat exchanger 35 into the stripper column 52. The heat exchanger 35 can remain the temperature of the stream at the temperature it has at the beginning of line 34 or can heat the stream to a temperature of 15° C. to 90° C., but more commonly at 80° C., wherein a bottom stream of the debutanizer distillation column 54 is fed via line 18 as the heating medium into the heat exchanger 35 and is withdrawn from the heat exchanger 35 via line 36. Line 36 is connected with a heat exchanger 37 for cooling the stabilized naphtha stream to 10° C. to 60° C., but more commonly at 40° C. and the line 36 splits downstream of the heat exchanger 37 into a line 19, via which the stabilized naphtha stream is withdrawn from the plant 100, and into a line 11, via which a part of the stabilized naphtha stream is introduced into the primary absorber as an absorption oil. The heat exchanger 37 can also comprise a fin-fan cooled exchanger, a cooling water exchanger or a combination of both.

The four vessels, i.e. the sponge absorber column 53, the primary absorber column 51, the stripper distillation column 52 and the debutanizer distillation column 54 are provided in the fractionating section 2 of the prior art plant 100. Each of these four vessels is a column with its own foundation. The overhead portion of the stripper distillation column 52 is, via line 12, in fluid communication with line 6 downstream of the entrance of line 8, but upstream of the heat exchanger 31, whereas the bottom portion of the primary absorber column 51 is, via line 14, in fluid communication with line 6 downstream of the heat exchanger 31. Thereby, during operation of the plant 100 the overhead stream of the stripper distillation column 52 and the bottom stream of the primary absorber column 51 are introduced into the mixed feed stream of the unstabilized naphtha stream and the lightened gas stream led through line 6.

Lines 10, 11 carry unstabilized and stabilized naphtha streams, respectively, to the primary absorber distillation column 51, in which the unstabilized and stabilized naphtha streams act as absorption oil that absorbs $C_3$ and heavier hydrocarbons from the lightened gas stream, which is introduced into the primary absorber distillation column 51 through line 13. An intercooler exchanger system 40 is in fluid communication with primary absorber column 51 and is used to remove the heat of absorption. Intercooler exchanger system 40 is optional and its use depends on the value of $C_3$ hydrocarbon recovery with respect to the increase in capital investment required. As set out above, the liquid bottom stream is carried from the primary absorber column 51 via line 14 to line 6, wherein the temperature of the liquid bottom stream during operation of the plant 100 is within line 14 between 20° C. and 65° C., but more commonly at 50° C. During the operation, the pressure will be the lowest at the top of primary absorber column 51 and the highest at the bottom of primary absorber column 51, with the pressure being in the range of 1.034 to 2.758 MPa, but more commonly at 1.344 MPa, whereas the temperature within the primary absorber column 51 is between 10° C. and 65° C., but more commonly at 45° C. The primary absorber column 51 comprises as internal separation devices trays, structured packings, collector trays, side draws or the like.

A line 20 fluidly connects the overhead portion of the primary absorber column 51 and the sponge absorber column 53. The fuel gas obtained during the operation of the plant 100 as overhead stream of the sponge absorber column 53 is withdrawn via line 21 from the plant 100, whereas a line 22 carries lean sponge oil to the sponge absorber column 53. A heat exchanger 38 upstream of line 22 controls the temperature of the lean sponge oil to be between 10° C. and 65° C., but more commonly at 45° C. The liquid bottom stream, which is rich sponge oil, having a temperature of 10° C. to 65° C., but more commonly at 45° C. is withdrawn from the sponge absorber column 53 and from the plant 100 via a line 23. During the operation, the pressure will be the lowest at the top of the sponge absorber column 53 and the highest at the bottom of sponge absorber column 53, with the pressure being in the range of 0.965 to 2.758 MPa, but more commonly at 1.31 MPa, whereas the temperature within the sponge absorber column 53 is between 10° C. and 65° C., but more commonly at 45° C. The sponge absorber column 53 comprises as internal separation devices trays, structured packings, collector trays, side draws or the like.

Line 24 carries unstabilized naphtha stream as the liquid bottom stream from the stripper distillation column 52 into the debutanizer distillation column 54. During the operation of the plant, the temperature of the liquid bottom stream within line 24 is between 95° C. and 205° C., but more commonly at 120° C. A reboiler 500 is associated with stripper column 52 to provide heat input. The reboiler 500 draws a stream of liquid phase hydrocarbons from the stripping section zone of the stripper distillation column 52 via line 16 and vaporizes at least a portion of the liquid passing through reboiler 500 to produce a heated stream in line 17, from which it is reintroduced into the stripper distillation column 52. During the operation of the plant 100, the pressure will be the lowest at the top of stripper distillation column 52 and the highest at the bottom of the stripper distillation column 52, with the pressure being in the range of 1.103 to 2.827 MPa, but more commonly at 1.448 MPa, whereas the temperature within the stripper distillation column 52 is between 45° C. and 205° C., but more commonly between 55 and 120° C. The stripper distillation column 52 comprises as internal separation device trays, structured packings, collector trays, side draws or the like.

Line 25 carries overheads from the debutanizer distillation column 54 and line 18 carries the liquid bottom stream from debutanizer column 54. During the operation of the plant 100, the temperature of the liquid bottom stream within line 18 is between 120° C. and 205° C., but more commonly at 180° C. A reboiler 501 is associated with the debutanizer distillation column 54 to provide heat input. The reboiler 501 draws a stream of liquid phase hydrocarbons from the stripping section zone of the debutanizer distillation column 54 via line 28 and vaporizes at least a portion of the liquid to produce a heated stream in line 29, which is reintroduced into the debutanizer distillation column 54 via line 29. During the operation, the pressure will be the lowest at the top of debutanizer distillation column 54 and the highest at the bottom of the debutanizer distillation column 54, with the pressure being in the range of about 0.689 to 1.241 MPa, but more commonly at 0.965 MPa, whereas the temperature within the debutanizer distillation column 54 is between 20 and 205° C., but more commonly between 40 and 180° C. The debutanizer distillation column 54 comprises as internal separation device trays, structured packings, collector trays, side draws or the like.

The LPG condensing section 3 is designed as a total condenser. As is common in the industry it could utilize a hot vapor bypass to aid in pressure control. As set out above, line 25 carries the overhead stream from the debutanizer distillation column 54 to the LPG condensing section 3 comprising a condenser 4. Line 27 carries an LPG stream having a temperature between 10° C. and 65° C., but more commonly at 45° C. away from the LPG condensing section 3 for collection or use in a downstream process, whereas line 26 carries the reflux back to the debutanizer distillation column 54. During the operation of the plant, the temperature of the reflux to the debutanizer distillation column 54 is between 10° C. and 65° C., but more commonly at 45° C. and the operating pressure of LPG condensing section 3 is between 0.62 and 1.172 MPa, but more commonly at 0.896 MPa.

Figure 2:
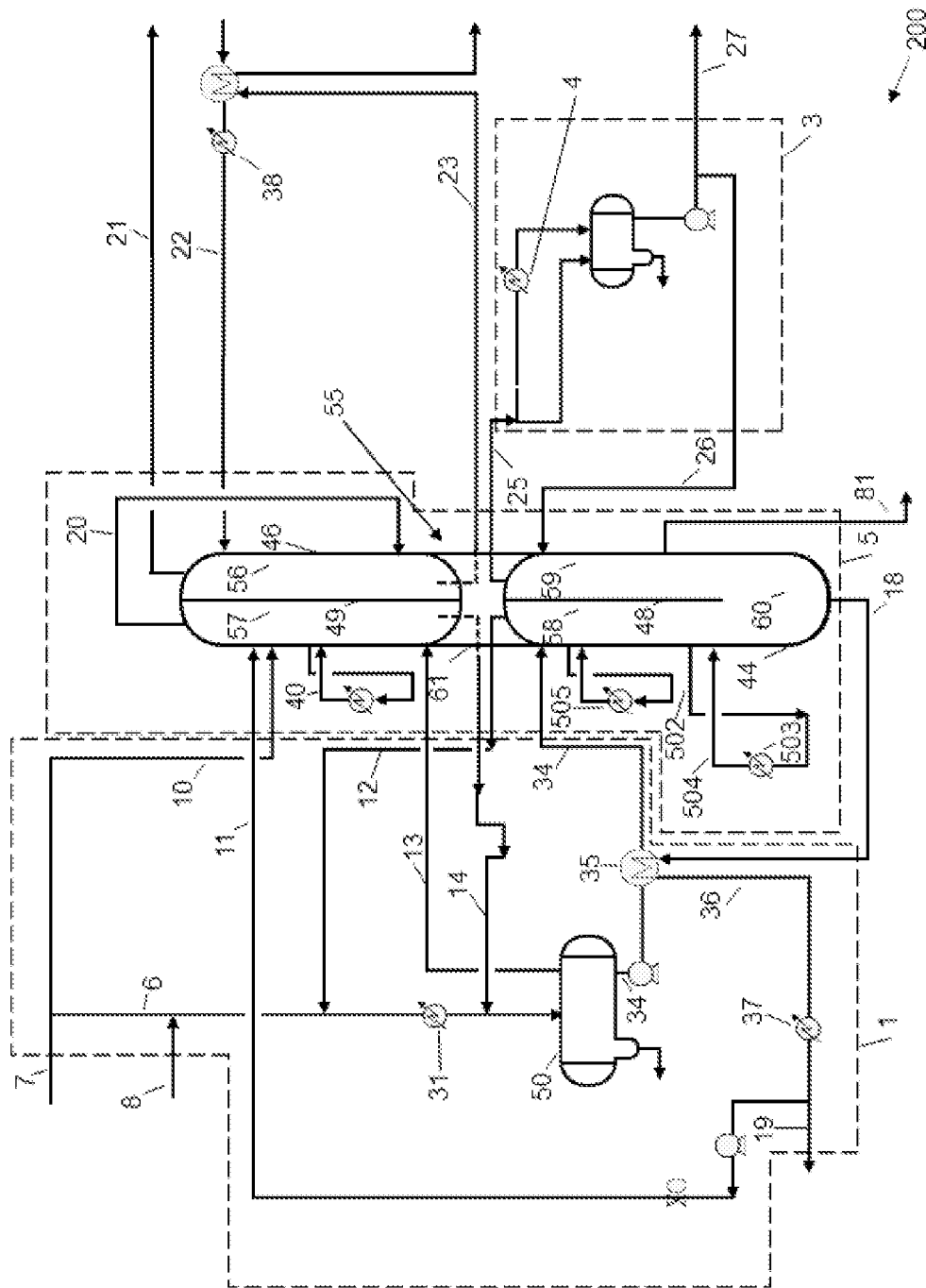
FIG. 2 illustrates a plant in accordance with an embodiment of the present disclosure.

Referring now to FIG. 2, a naphtha stabilization and LPG recovery plant 200 in accordance with one embodiment of the present disclosure is illustrated. The plant 200 comprises a cooling and absorbing section 1, a fractionating section 2 and a LPG condensing section 3, whereas the absorbing section 1 and the LPG condensing section 3 are identical to those described above for FIG. 1. Plant 200 is also used to separate unstabilized naphtha stream(s) and lightened component stream(s) into a fuel gas stream being output via a line 21, a non-condensable stream LPG stream being output via a line 27 and a stabilized naphtha stream being output via a line 19 from the plant 200. However, in contrast to the prior art plant 100 shown in FIG. 1, the plant 200 in accordance with one embodiment of the present disclosure shown in FIG. 2 comprises in its fractionating section 2 only one vessel 55 with one foundation. More specifically, the vessel 55 comprises a first divided-wall column 44 and a second column 46. The first divided-wall column 44 comprises a dividing wall 48, which extends from the top of the first divided-wall column 44 vertically downwards and extends from the top of the first divided-wall column 44 over about 50% of the height of the first divided-wall column 44. The dividing wall 48 of the first divided-wall column 44 separates a stripper section 58 from a stabilization section 59, and below the lower edge of the dividing wall 48 a common stripping section 60 is present. The second column 46 comprises a sponge absorber section 56 and a primary absorber section 57, which are separated from each other by a dividing wall 49 extending from the top to the bottom of the second column 46. The first divided-wall column 44 is placed on the bottom and is connected with the second column 46 by a wall 61 so that the first divided-wall column 44 and the second column 46 form one vessel 55 with one foundation. Thus, vessel 55 comprises the four different vessels or columns 51, 52, 53, 54, respectively, of the prior art plant 100. More specifically, the sponge absorber section 56 operates similar to the sponge absorber column 53, the primary absorber section 57 operates similar to primary absorber column 51, the stripper section 58 operates similar to stripper distillation column 52 and the stabilization section 59 operates similar to the debutanizer (or stabilization, respectively) distillation column 54 of the prior art plant 100 shown in FIG. 1. Thus, lines 10, 11 and 13 are leading into the primary absorber section 57 of the vessel 55 and line 34 leads into the stripper section 58 of vessel 55, whereas line 18 is connected with the bottom portion of vessel 55, line 12 is connected with the overhead portion of the stripper section 58 of the vessel 55 and line 14 is connected with the bottom portion of the primary absorber section 57 of the vessel 55. Line 20 connects the overhead portion of the primary absorber section 57 and the lower portion of the sponge absorber section 56 of the vessel 55. Line 24 of plant 100 of FIG. 1 is not present in the plant 200 of FIG. 2. Line 71 allows withdrawal of a light stabilized naphtha stream from the divided-wall column 44.

Line 22 carries lean sponge oil to the sponge absorber section 56 of vessel 55. During the operation of the plant 200, the temperature of the lean sponge oil is between about 10° C. and 65° C., but more commonly at 45° C. Lower temperatures can improve $C_3$ hydrocarbon recovery but increase capital and operating costs, and the benefit must be financially evaluated. Line 23 carries bottoms liquid from the sponge absorber section 56, wherein line 23 is coupled between the sponge absorber section 56 and a heat exchanger 38 that exchanges heat between the bottoms liquid and the lean sponge oil of line 22. During the operation of plant 200, the temperature of the rich sponge oil of line 23 is between 20° C. and 65° C., but more commonly at 50° C., wherein the pressure is lowest at the top of sponge absorber section 56 and the pressure is highest at the bottom of sponge absorber section 56 with the pressure being in the range of 0.965 to 2.758 MPa, but more commonly at about 1.31 MPa. The design pressure depends on the value of $C_3$ recovery with respect to the increase in capital investment required. The temperature profile within sponge absorber section 56 may depend on the pressure profile and the composition of the vapor and/or liquid along the length of sponge absorber section 56, the temperature of line 22, and the temperature of line 20. During the operation of the plant 200, the temperature within the sponge absorber section 56 is between 10° C. and 65° C., but more commonly at 45° C. The sponge absorber section 56 of vessel 55 comprises as internal separation device trays, structured packings, collector trays, side draws or the like.

Lines 10, 11 carry a stabilized naphtha stream and an unstabilized naphtha stream, respectively, as absorption oil used to absorb $C_3$ and heavier hydrocarbon components coming in as lightened component gas through line 13 into the primary absorber section 57 of vessel 55. An intercooler exchanger system 40 is in fluid communication with the primary absorber section 57 and is used to remove the heat of absorption. Line 14 carries a liquid bottom stream from the primary absorber section 57 into the line 6, wherein the temperature of the liquid bottom stream is between 20° C. and 65° C., but more commonly at 50° C. During the operation of plant 200, the pressure will be the lowest at the top of primary absorber section 57 and the highest at the bottom of primary absorber section 57 with the pressure being in the range of about 1.034 to 2.758 MPa, but more commonly at about 1.344 MPa, whereas the temperature within the primary absorber section 57 is between 45° C. to 205° C. but more commonly between 55 to 120° C. The primary absorber section 57 comprises as internal separation device trays, structured packings, collector trays, side draws or the like. Line 12 carries the overhead stream from the stripper section 58 to line 6 and line 34 carries unstabilized naphtha from the high-pressure receiver 50 to stripper section 58 of vessel 55, wherein the temperature of the stream carried to the stripper section 58 by line 34 is between 15° C. to 90° C. but more commonly at about 80° C. A side reboiler 505 is provided and used to draw a stream from stripper section 58 at any point along its length to provide additional boil-up. The side reboiler 505 comprise any suitable device for heating and at least partially vaporizing the liquid stream, such as a heat exchanger, a heater (e.g., a furnace, etc.) or the like. A reboiler 503 is associated with the common stripping section 60 so as to draw a stream of liquid phase hydrocarbons from the common stripping section 60 and vaporize at least a portion of the liquid to produce a heated stream in line 504. Line 502 is in fluid communication between the common stripping section 60 and reboiler 503, whereas line 504 is in fluid communication between reboiler 503 and the common stripping section 60. During the operation of the plant 200, the pressure will be the lowest at the top of stripper section 58 and the stabilization section 59 and the highest at the bottom of the common stripping section 60, with the pressure being in the range of about 1.103 to 2.827 MPa, but more commonly at about 1.448 MPa, whereas the temperature within the stripper section 58 and the stabilization section 59 is as low as 45° C. and 20° C., respectively, and as high as about 205° C. in the bottom of the common stripping section 60 of the vessel 55. The stripper section 58 as well as the stabilization section 59 of the vessel 55 comprise as internal separation device trays, structured packings, collector trays, side draws or the like. Line 25 carries the overhead stream from the stabilization section 59, whereas line 18 carries the liquid bottom stream from the common stripping section 60 of the vessel 55. During the operation of plant 200, the temperature of the liquid bottom stream is between about 120° C. and 205° C., but more commonly at about 180° C.

The LPG condensing section 3 of the plant 200 is designed as a total condenser. Line 25 is in fluid communication with stabilization section 59 of the first divided-wall column 44 of the vessel 55. Line 25, which carries overheads from stabilization section 59, is in fluid communication with LPG condensing section 3 comprising a condenser 4. Line 27 carries an LPG stream from the LPG condensing section 3. During the operation of plant 200, the temperature of the LPG in line 27 is between 10° C. and 65° C., but more commonly at about 45° C. Line 26 carries reflux from the condenser 4 of the LPG condensing section 3 to the stabilization section 59, wherein the temperature of the reflux to the stabilization section 59 is between 10° C. and 65° C. and the operating pressure of LPG condensing section 3 is between about 0.62 and 1.172 MPa, but more commonly at about 0.896 MPa.

Figure 3:
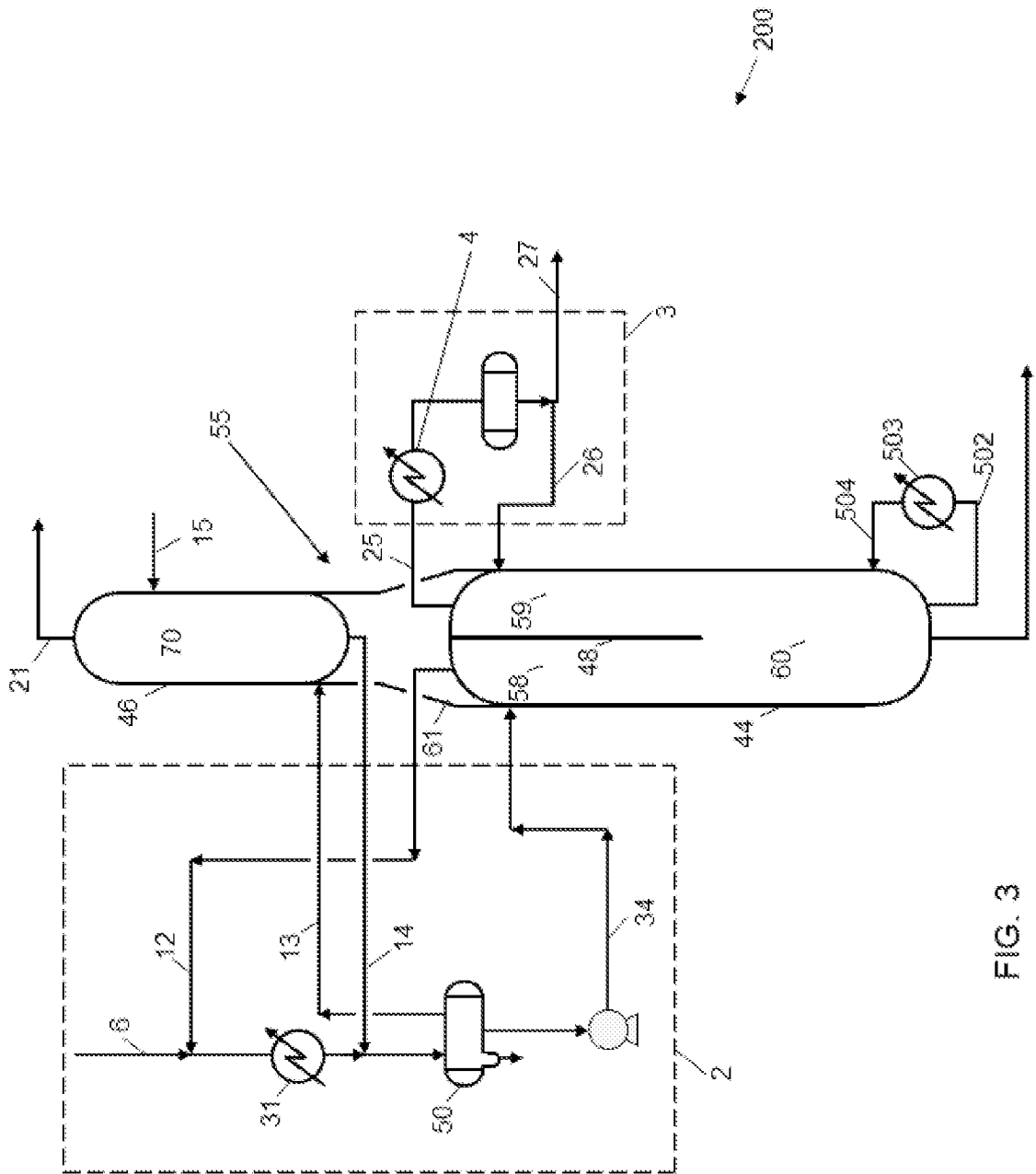
FIG. 3 illustrates a vessel of a plant in accordance with another embodiment of the present disclosure.

Referring now to FIG. 3, a naphtha stabilization and LPG recovery plant 200 according to another embodiment of the present disclosure is illustrated. The plant 200 shown in FIG. 3 is similar to the plant 200 shown in FIG. 2, but the second column 46 comprises not a dividing wall and thus only an absorber section 70 instead of a sponge absorber section 56 and a primary absorber section 57. The absorber section 70 receives a feed from line 13 and lean oil from line 15. Line 21 carries off gas from the absorber section 70 for collection or use in a downstream process. In the embodiment of FIG. 3, the stripper section 58 is configured to remove $C_2$ and lighter hydrocarbon components, whereas the stabilization section 59 is configured as a depropanizer or a debutanizer as desired depending on the desired outputs. The primary absorber section 70, the stripper section 58 and the stabilization section 59 comprise as internal separation device trays, structured packings, collector trays, side draws or the like. The remainder of plant 200 is configured similarly to plant 200 shown in FIG. 2 and as described above.

Figure 4:
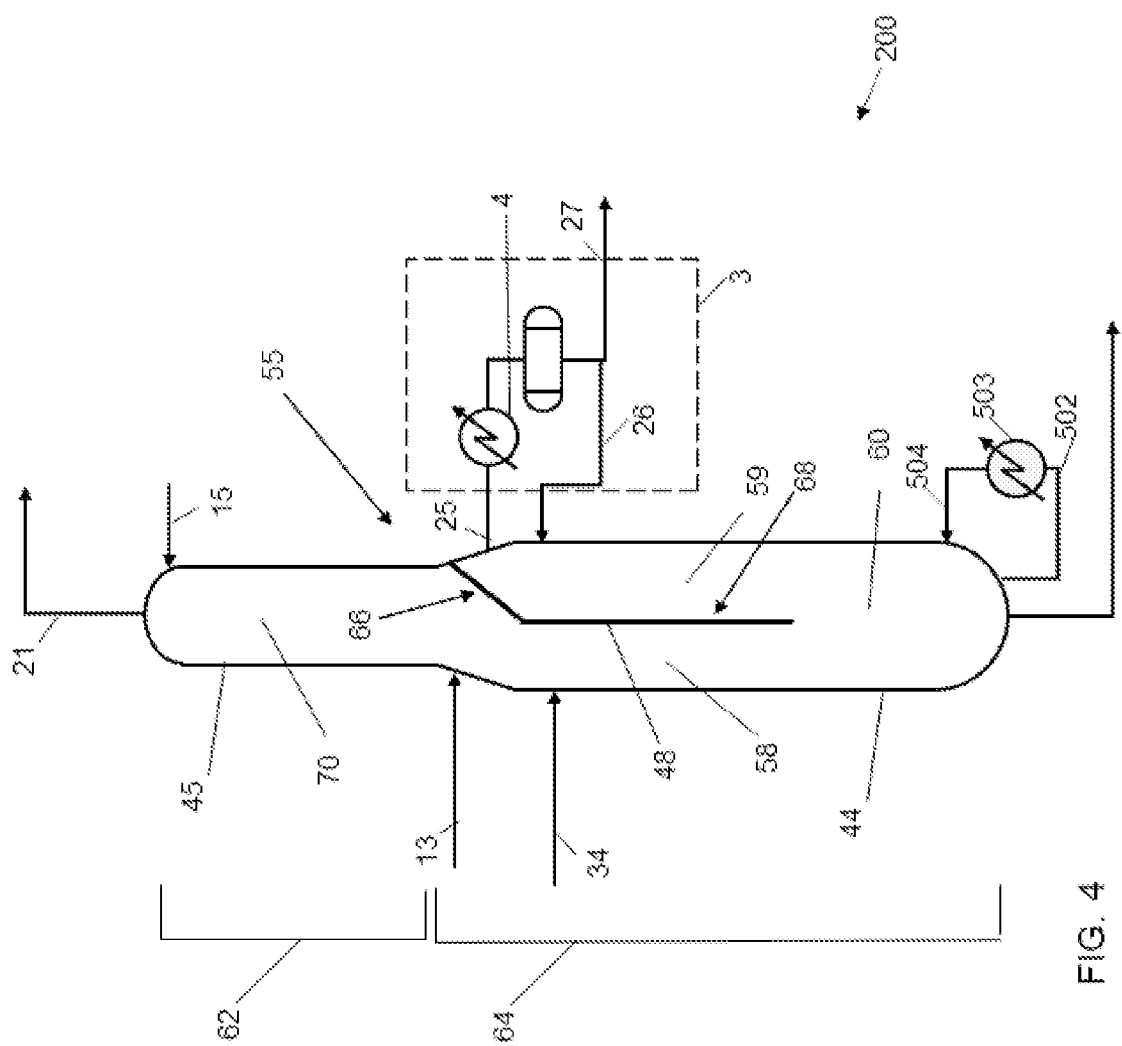
FIG. 4 illustrates a vessel of a plant in accordance with an embodiment of the present disclosure.

Referring now to FIG. 4, a naphtha stabilization and LPG recovery plant 200 according to another embodiment of the present disclosure is illustrated. The plant 200 comprises a vessel 55 comprising a dividing-wall column 44, wherein the absorber section 70 is arranged in the vessel 55 within the first divided-wall column 44 and not as in the embodiments shown in FIGS. 2 and 3 outside of the first divided-wall column 44. Thus, in this embodiment the vessel 55 is the first distillation column 44 and thereby, two distillation columns 52, 54 and one absorber column 51 required in the prior art plant as shown in FIG. 1 are combined in this embodiment to one column 44 and one vessel 55. Thereby, the overall amount of metal required for the vessel and column insulation of the plant of the present invention is drastically reduced, namely by up to 30%. In addition, the number of vessels is reduced from three to one and the number of foundations is reduced from three to one. Furthermore, this embodiment allows one to reduce the total number of ladders and platforms in half and the resulting weight reduction decreases the load that is supported by the single foundation. The dividing-wall column 44 may be connected via the lines 13, 34 with a cooling and absorbing section 1 as shown in FIG. 2 or as shown in FIG. 3.

The divided-wall column 44 comprises an outer wall 45 comprising an upper section 62, which comprises the absorber section 70, and a lower section 64, which is connected with the upper section 62, wherein the lower section 64 comprises the dividing wall 48, the stripper section 58 and the stabilization section 59. The uppermost part of the dividing wall 48 defines the upper end of the lower section 64 and the lower end of the upper section 62. The upper section 62 of the divided-wall column 44 of this embodiment has a smaller diameter than the lower section 64 of the divided-wall column 44. The dividing wall 48 extends from the uppermost part of the lower section 64 of the first divided-wall column downwardly so as to partially divide the lower section 64 of the divided-wall column 44 into a first side comprising the stripper section 58 and into a second side comprising the stabilization section 59 so that the lower section 64 comprises an upper portion with the first side and the second side being divided by the dividing wall 48 arranged therebetween and a further lower portion 60 being not divided by the dividing wall 48. The dividing wall extends from the uppermost part of the lower section 64 of the divided-wall column 44 downwards over about 50% of the height of the divided-wall column 44. The dividing wall 48 comprises an upper inclined section 66 and a lower vertical section 48, wherein the upper inclined section 66 extends from the lower vertical section 68 to the inner side of the outer wall 45 of the divided-wall column 44. In other words, the upper inclined section 66 of the dividing wall 48 connects the lower vertical section 68 of the divided-wall column 44 fluidly tightly with the outer wall 45 of the divided-wall column 44. Lines 13 and 34 may come for instance from the cooling and absorbing section 1 as shown in FIG. 2, i.e. the gas phase of the high-pressure receiver 50 is fed via a line 13 into the primary absorber section 70, whereas the liquid phase of the high-pressure receiver 50 is fed via line 34 to the stripper section 58 of the divided-wall column 44. Lean oil is provided to the absorber section 70 of the divided-wall column 44 via line 15, whereas off gas is withdrawn from the overhead of the divided-wall column 44 via line 21. The stabilization section 59 of the divided-wall column 44 is connected with a LPG condensing section 3, which is configured as shown in FIG. 2 and in FIG. 3. The primary absorber section 70, the stripper section 58 and the stabilization section 59 comprise as internal separation device trays, structured packings, collector trays, side draws or the like.

Figure 5:
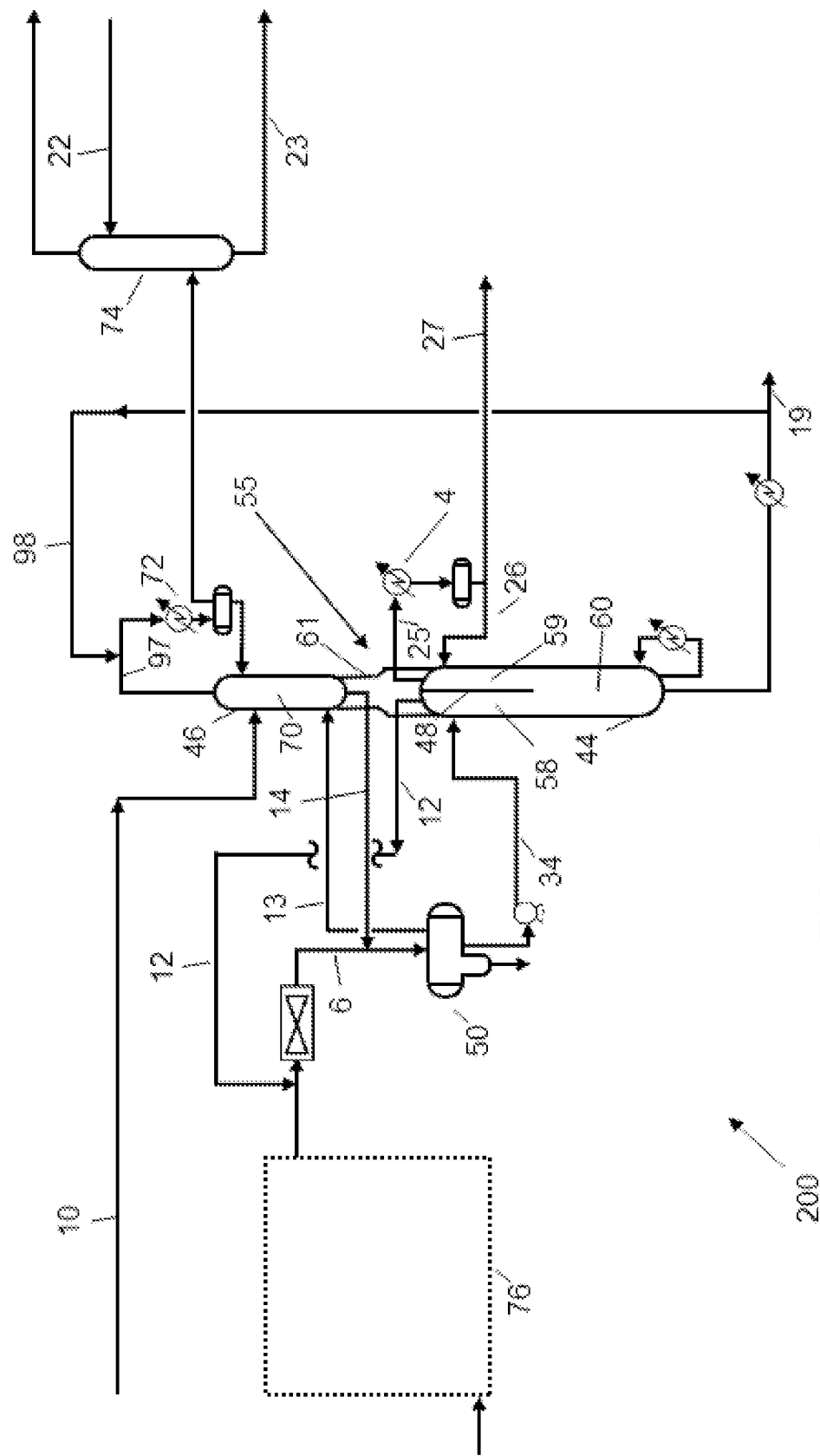
FIG. 5 illustrates a plant in accordance with another embodiment of the present disclosure.

Referring now to FIG. 5, a naphtha stabilization and LPG recovery plant 200 according to another embodiment of the present disclosure is illustrated. The plant 200 is similar to the plant 200 shown in FIG. 3 but incorporates a condenser 72 and sponge absorber 74 that are coupled to the absorber section 70. The condenser 72 receives off gas from the absorber section 70 and cools it. Stabilized naphtha stream led in line 98 is used as an absorption oil and combined with the stream transported in line 97 to recover compounds heavier than ethane. The condensed liquid from condenser 72 is recycled to the absorber section 70 and the vapor from condenser 72 is provided to the sponge absorber 74. In the embodiment of FIG. 5, lean oil is provided to the sponge absorber 74. The sponge absorber 74 outputs rich oil as bottoms stream via line 23 and off-gas via line 21. In the embodiment of FIG. 5, a compressor section 76 provides a feed to high-pressure receiver 50.

Figure 6:
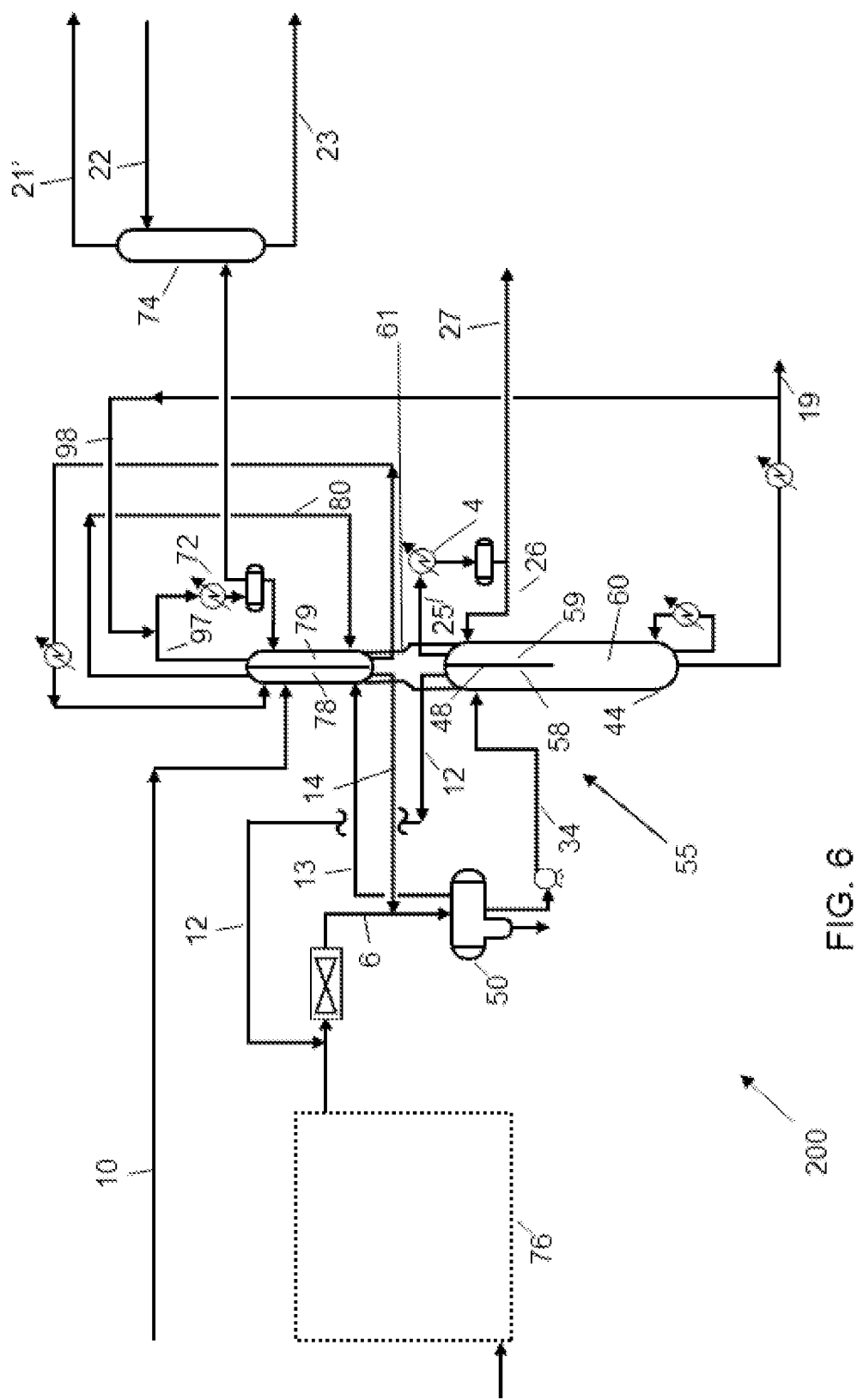
FIG. 6 illustrates a plant in accordance with an embodiment of the present disclosure.

Referring now to FIG. 6, a naphtha stabilization and LPG recovery plant 200 according to another embodiment of the present disclosure is illustrated. The plant 200 is similar to the plant 200 shown in FIG. 5, but the absorber section 70 has been split into two absorber sections 78, 79 on opposite sides of the second divided wall column 46. In some embodiments, it may be desirable for the total height of vessel 55 to be reduced. The height of absorber section 70 can essentially be cut in half by incorporating a divided wall column to form two absorber sections 78, 79, each of which has a reduced height compared to absorber section 70. During the operation, fluid exits the top of absorber section 78 through line 80, which then feeds the fluid to a bottom section of absorber section 79. Fluid then exits absorber section 79 and enters condenser 72 similar to the discussion of plant 200. The remainder of plant 200 is similar to the plant 200 shown in FIG. 5.

Figure 7:
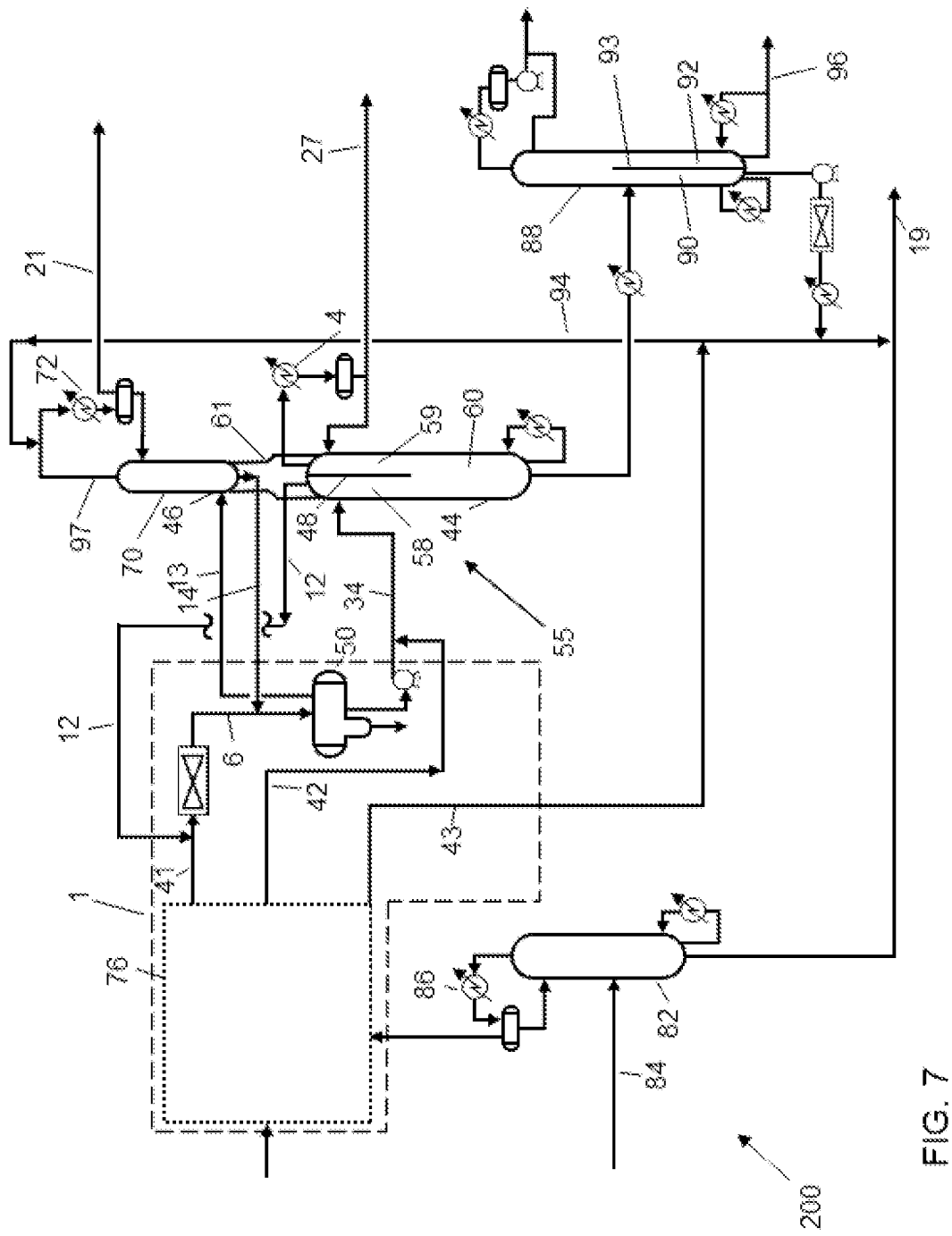
FIG. 7 illustrates a plant in accordance with another embodiment of the present disclosure.

Referring now to FIG. 7, a naphtha stabilization and LPG recovery plant 200 according to another embodiment of the present disclosure is illustrated. The plant 200 is similar to the plant 200 shown in FIG. 3 and includes some of the core components of the plant 200 shown in FIG. 3, such as cooling and absorbing section 1, LPG condensing section 3 and vessel 55. As illustrated in FIG. 7, the feed to the compressor section 76 may include various streams, such as stabilizer gas streams from hydrotreaters and reformers. The compressor section 76 outputs gases via a line 41, liquids via a line 42 and heavy liquids via a line 43. The compressor section 76 condenses compounds at different temperatures and pressures, which leads to streams with different compositions. In the embodiment of FIG. 7, the heavy liquid stream is of a composition that acts as a good absorption oil to help recover LPG, so the heavy liquid stream can be sent to the absorber for that purpose. Line 41 directs gases from compressor section 76 to the high-pressure receiver 50, and line 42 directs liquids from the compressor section 76 to line 34 and ultimately to the stripper section 58 of vessel 55. The plant 200 further includes a stabilizer 82 that receives a feed via line 84 that can include various streams, such as stabilizer liquid streams from hydrotreaters and reformers. Stabilizer 82 outputs lights to a condenser 86. Non condensed vapors are fed from condenser 86 to compressor section 76 and the condensed feed is refluxed to stabilizer 82. Stabilizer 82 also outputs bottoms (e.g., $C_{5+}$ hydrocarbons) for collection or for use in a downstream process. The plant 200 also includes a third column, namely a divided wall column 88. The divided wall column 88 includes a first section 90 and a second section 92 formed on either side of a bottom dividing wall 93. The first section 90 is configured as a debutanizer and the second section 92 is configured as a deisobutanizer. The bottom stream from first section 90 (e.g., stabilized naphtha/lean oil) is fed via line 94 to the condenser 72 and the bottom stream from the second section 92 (e.g., nC4) is output via line 96 for collection or for use in a downstream process.

The invention claimed is:

1. A plant for separating at least one purified hydrocarbon stream from at least one crude hydrocarbon feed stream, the plant comprising:
a vessel with a single foundation, the vessel comprising:
an absorber section; and
a first divided-wall column,
the first divided-wall column comprising:
an outer wall,
a dividing wall,
a stripper section,
a stabilization section,
a feed line coupled to the stripper section and configured to provide at least one hydrocarbon feed stream to the stripper section,
a bottoms removal line for removing a stabilized naphtha product and being coupled to a bottom of the divided-wall column and configured to remove a bottom stream from the first divided-wall column,
two absorption fluid lines coupled to the absorber section and configured to provide absorption fluid to the absorber section of the first divided-wall column,
a gas removal line coupled to the top of the first divided-wall column and configured to remove a gas stream from the first divided-wall column,
an upper section that comprises the absorber section, and
a lower section that is connected with the upper section, the lower section comprising the dividing wall, the stripper section and the stabilization section,
the dividing wall comprising an upper inclined section and a lower essentially vertical section,
the upper inclined section of the dividing wall extending from an upper edge of the lower essentially vertical section in an inclined angle to the outer wall and being fluid tightly connected with the outer wall, and
the inclined angle between the upper inclined section and a length axis of the first divided-wall column is more than 90° and less than 180° seen in a direction from the bottom to a top of the first divided-wall column.

2. The plant in accordance with claim 1, wherein:
the dividing wall partially divides the first divided-wall column into a first side comprising the stripper section and a second side comprising the stabilization section such that the first divided-wall column comprises a first portion with the first side and the second side being divided by the dividing wall arranged therebetween and at least one further portion not divided by a dividing wall.

3. The plant in accordance with claim 1, further comprising:
at least one of a condenser and a reboiler, the condenser being coupled to the stabilization section of the first divided-wall column via a gas line so as to receive a gas stream from the stabilization section and coupled to the stabilization section of the first divided-wall column via a first recirculation line so as to recirculate at least a part of condensate formed in the condenser into the stabilization section of the first divided-wall column, and the reboiler being coupled to a bottom of first divided-wall column via a liquid line and configured to receive a bottom stream from the first divided-wall column and coupled to the bottom of first divided-wall column via a second recirculation line so as to recirculate at least a part of a gas formed in the reboiler into the first divided-wall column.

4. The plant in accordance with claim 1, wherein:
the first divided-wall column is a closed column,
the dividing wall extends from a top of the first divided-wall column over a part of a height of the first divided-wall column at least essentially vertically downwards such that the divided-wall column comprises an upper portion with a first side and a second side being divided by the dividing wall arranged therebetween and a lower portion not divided by the dividing wall,
essentially vertically downwards means that an angle between the dividing wall and a length axis of the first divided-wall column is at most 20°, the height of the first divided-wall column is a straight distance between the top and a bottom of the first divided-wall column, and the dividing wall of the first divided-wall column extends from the top of the first divided-wall column over 10 to 95% of the height of the first divided-wall column.

5. The plant in accordance with claim 1, wherein:
the vessel comprises a second column arranged on top of or above the first divided-wall column,
the second column comprises the absorber section, at least one feed line and at least one removal line, and
the second column is connected with the first divided-wall column by a connection part.

6. The plant in accordance with claim 5, wherein:
the second column is a second divided-wall column comprising a second outer wall and a second dividing wall,
the second dividing wall at least partially divides the second divided-wall column into a first side comprising a primary absorber section and a second side comprising a sponge absorber section, and
the second dividing wall of the second divided-wall column extends from a top of the second divided-wall column at least essentially vertically downwards to a bottom of the second divided-wall column so as to fluid tightly separate the first side from the second side of the second divided-wall column.

7. The plant in accordance with claim 1, wherein:
the dividing wall extends from an uppermost part of the lower section of the first divided-wall column downwardly so as to partially divide the lower section of the first divided-wall column into a first side comprising the stripper section and a second side comprising the stabilization section such that the lower section comprises an upper portion with the first side and the second side divided by the dividing wall arranged therebetween and a lower portion not divided by the dividing wall.

8. The plant in accordance with claim 7, wherein:
the upper inclined section comprises a first upper edge and a first lower edge and the lower essentially vertical section comprises the upper edge and a second lower edge,
the upper edge of the lower essentially vertical section and the first lower edge of the upper inclined section are connected with each other over an entire length of both the second upper edge and the first upper edge, and
the lower essentially vertical section extends at least essentially vertically downwards.

9. The plant in accordance with claim 7, further comprising:
at least one of a condenser and a reboiler, the condenser being coupled to the stabilization section of the first divided-wall column via a gas line so as to receive a gas stream from the stabilization section and coupled to the stabilization section of the first divided-wall column via a first recirculation line so as to recirculate at least a part of a condensate formed in the condenser into the stabilization section of the first divided-wall column, and the reboiler being coupled to a bottom of the first divided-wall column via a liquid line and configured to receive a bottom stream from the first divided-wall column and coupled to the bottom of the first divided-wall distillation column via a second recirculation line so as to recirculate at least a part of a gas formed in the reboiler into the first divided-wall distillation column.

10. The plant in accordance with claim 1, further comprising:
at least one of a high-pressure receiver unit and an intercooler exchange system, the high-pressure receiver unit comprising at least one inlet line and at least one outlet line, at least one of the at least one outlet line being directly or indirectly coupled with the stripper section of the first divided-wall column, and the intercooler exchange system being in fluid communication with the absorber section via a first inlet line and a first outlet line and being in fluid communication with a primary absorber section if the absorber section comprises a primary absorber section and a sponge absorber section.

11. The plant in accordance with claim 1, further comprising:
at least one of a sponge absorber column and a second divided-wall column, the sponge absorber column being arranged outside the vessel, and the second divided-wall column being arranged outside the vessel and comprising a second dividing wall,
wherein the second divided-wall column is a bottom divided-wall column in which the second dividing wall extends from a bottom of the second divided-wall column upwardly over 10 to 95% of a height of the second divided-wall column.

12. A process comprising:
separating the at least one purified hydrocarbon stream from the at least one crude hydrocarbon feed stream, wherein the process is performed in the plant in accordance with claim 1.

13. The process in accordance with claim 12, wherein:
one of the at least one crude hydrocarbon feed stream is a gas stream obtained in a fluid catalytic cracking unit, in a saturated gas plant, in a coker gas plant, in an isomerization unit stabilization section, in a flare header recovery system or in a natural gas liquids fractionating plant,
if the at least one crude hydrocarbon feed stream includes two crude hydrocarbon feed streams, the two crude hydrocarbon feed streams are an unstabilized naphtha stream and a lightened gas stabilized stream, and
the at least one purified gas hydrocarbon stream includes a naphtha stream, a LPG stream and a fuel gas stream.

14. The process in accordance with claim 12, wherein:
the at least one crude hydrocarbon feed stream is first fed into a high-pressure receiver unit in which propane and heavier compounds are condensed to a condensed liquid phase while keeping ethane and lighter components in a gas phase, and
the condensed liquid phase is fed via a feed line into the stripper section of the first divided-wall column.

15. The process in accordance with claim 12, wherein:
at least one of the at least one crude hydrocarbon feed stream comprising at least one of unstabilized naphtha and lightened gas is fed to the stripper section,
in the stripper section $C_2$ and lighter hydrocarbons are separated, and
in the stabilization section $C_3$ and $C_4$ hydrocarbons are separated such that a $C_5$+hydrocarbon stream is obtained as a bottom stream, a hydrocarbon stream including $C_3$ and $C_4$ hydrocarbons is obtained as an overhead stream of the stabilization section and a fuel gas stream is obtained as an overhead stream of the absorber section of the vessel.

* * * * *